United States Patent
Shim (10) Patent No.: US 9,124,836 B2
(45) Date of Patent: Sep. 1, 2015

(54) IMAGE SENSOR AND METHOD OF DRIVING THE SAME

(71) Applicant: DONGBU HITEK CO., LTD., Seoul (KR)

(72) Inventor: Hee Sung Shim, Gangneung-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 252 days.

(21) Appl. No.: 13/832,064

(22) Filed: Mar. 15, 2013

(65) Prior Publication Data

US 2014/0252204 A1  Sep. 11, 2014

(30) Foreign Application Priority Data

Mar. 7, 2013  (KR) .................. 10-2013-0024320

(51) Int. Cl.
*H04N 5/378* (2011.01)
*H04N 5/235* (2006.01)
*H04N 5/355* (2011.01)
*H04N 5/3745* (2011.01)

(52) U.S. Cl.
CPC ............. *H04N 5/378* (2013.01); *H04N 5/2355* (2013.01); *H04N 5/35581* (2013.01); *H04N 5/3745* (2013.01)

(58) Field of Classification Search
USPC ..... 250/208.1, 214.1, 214 R, 214 DC, 214 A; 257/431; 348/272, 281, 294, 297, 299
See application file for complete search history.

(56) References Cited

U.S. PATENT DOCUMENTS

2011/0309235 A1* 12/2011 Yoshida .................... 250/208.1

FOREIGN PATENT DOCUMENTS

| JP | 2011119837 A | 6/2011 |
|---|---|---|
| KR | 10-2007-0064838 A | 6/2007 |
| KR | 100765252 B1 | 10/2007 |
| KR | 10-2012-0036557 A | 4/2012 |
| KR | 1020120122165 A | 11/2012 |

OTHER PUBLICATIONS

Office Action dated Mar. 7, 2014, in Korean Application No. 10-2013-0024320.
Korean Notice of Allowance dated Dec. 5, 2014 for Korean Patent No. 10-2013-0024320 from the Korean Intellectual Patent Office; 6 pgs.
Jung Bum Chun and Hun Joon Jung; "Apparatus and Method for Expanding Dynamic Range of Image Sensor"; Oct. 9, 2007; Bibliographic Data of KR100765252 (B1); Espacenet.

(Continued)

*Primary Examiner* — Francis M Legasse, Jr.

(74) *Attorney, Agent, or Firm* — Andrew D. Fortney; Central California IP Group, P.C.

(57) ABSTRACT

An image sensor is provided. An image sensor can include a plurality of unit pixels. Each of the unit pixels can include a photoelectric converter as a light receiving element. In each unit pixel, a transport switching unit can transport charges in the photoelectric converter to a floating diffusion region, and a first switching unit can selectively connect the floating diffusion region to a first sensing line. A second switching unit can selectively connect the floating diffusion region to a second sensing line, and a first sensing part can be connected to the first sensing line, and a second sensing part can be connected to the second sensing line.

19 Claims, 4 Drawing Sheets

(56) References Cited

OTHER PUBLICATIONS

Hyun Taek Shin; "Image Sensor Having WDR, an Image Pixel Circuit Thereof, and a Driving Method Thereof for Easily Optimizing a Process of a Photodiode"; Nov. 7, 2012; Korean Abstract of 1020120122165 (A); kpa.kipris.or.kr.

Sokichi Hirotsu, Ayako Hirotsu and Juichi Hirotsu; "Solid-State Imaging Element"; Jun. 16, 2011; Japanese Abstract of JP2011119837 (A); Espacenet.

* cited by examiner

IMAGE SENSOR AND METHOD OF DRIVING THE SAME

CROSS-REFERENCE TO RELATED APPLICATION

This application claims the benefit under 35 U.S.C. §119 of Korean Patent Application No. 10-2013-0024320, filed Mar. 7, 2013, which is hereby incorporated by reference in its entirety.

BACKGROUND

A dynamic range is an important factor for indicating the image quality of an image sensor. A dynamic range generally represents the maximum range in which an input signal is processed without causing distortion. As the dynamic range of the image sensor is wider, a better image may be obtained without a brightness change of a wide range.

However, due to a narrow dynamic range, the related art color image sensor has a limitation that original colors thereof are not well represented, when any one or more of red, green and blue colors are saturated. In order to overcome the limitation of the narrow dynamic range, schemes of implementing wide dynamic range (WDR) pixels are suggested.

For example, a capacitor can be added to change floating diffusion (FD) capacity, and a transistor for controlling the added capacitor can also be added.

Alternatively, two independent photo diodes (PDs) can be included in a single pixel.

However, the above described schemes result in a large chip size and a complicated process by adding the capacitor or the PDs.

BRIEF SUMMARY

Embodiments of the subject invention provide an image sensor, as well as manufacturing and driving methods thereof, having a wide dynamic range by enabling image signals having different exposure times to be obtained in a single pixel.

Embodiments of the subject invention also provide an image sensor, as well as manufacturing and driving methods thereof, capable of enhancing color reproduction of an captured image by measuring charges which are overflowed in photo diodes (PDS) without including additional circuits.

In an embodiment, an image sensor can include a plurality of unit pixels, and each of the unit pixels can include: a photoelectric converter as a light receiving element; a transport switching unit transporting charges in the photoelectric converter to a floating diffusion region; a first switching unit selectively connecting the floating diffusion region to a first sensing line; a second switching unit selectively connecting the floating diffusion region to a second sensing line; a first sensing part connected to the first sensing line and converting a photo-electrically converted analog signal, stored in the floating diffusion region, to a digital signal on the basis of an offset value; and a second sensing part connected to the second sensing line and converting a photo-electrically converted analog signal, stored in the floating diffusion region, to a digital signal on the basis of an offset value. The first sensing part and the second sensing part can perform data processing on charge information obtained from pixels of different rows, and having different exposure times, at a predetermined timing.

In another embodiment, an image sensor can include: a photoelectric converter as a light receiving element; a transport switching unit transporting charges in the photoelectric converter to a floating diffusion region; a first switching unit selectively connecting the floating diffusion region to a first sensing line; and a second switching unit selectively connecting the floating diffusion region to a second sensing line; a first sensing part connected to the first sensing line and converting a photo-electrically converted analog signal, stored in the floating diffusion region, to a digital signal on the basis of an offset value; and a second sensing part connected to the second sensing line and converting a photo-electrically converted analog signal, stored in the floating diffusion region, to a digital signal on the basis of an offset value. The image sensor can be configured such that, in a first timing, for detecting charges overflowed from the photoelectric converter, first charge information of the floating diffusion region can be transported to the first sensing line and the first sensing part, due to operation of the first switching unit. The image sensor can be configured such that, in a second timing, the transport switching unit can be operated, charges stored in the photoelectric converter can be transported to the floating diffusion region, and second charge information in the floating diffusion region can be transported to the second sensing line and the second sensing part due to operation of the second switching unit.

In another embodiment, a method of driving an image sensor can include: in a first timing, operating a first switching unit to transport first charge information of a floating diffusion region to a first sensing line and a first sensing part; in a second timing, operating a transport switching unit to transport charges stored in a photoelectric converter to the floating diffusion region; and in the second timing, operating a second switching unit to transport second charge information from the floating diffusion region to a second sensing line and a second sensing part. The image sensor can include: a photoelectric converter as a light receiving element; a transport switching unit transporting charges in the photoelectric converter to a floating diffusion region; a first switching unit selectively connecting the floating diffusion region to a first sensing line; a second switching unit selectively connecting the floating diffusion region to a second sensing line; a first sensing part connected to the first sensing line and converting a photo-electrically converted analog signal, stored in the floating diffusion region, to a digital signal on the basis of an offset value; and a second sensing part connected to the second sensing line and converting a photo-electrically converted analog signal, stored in the floating diffusion region, to a digital signal on the basis of an offset value.

DETAILED DESCRIPTION

Deference will now be made in detail to the embodiments of the present disclosure, examples of which are illustrated in the accompanying drawings.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present.

In addition, the terms "first" and "second" can be selectively or interchangeably used for the members. In the figures, a dimension of each of elements may be exaggerated for clarity of illustration, and the dimension of each of the elements may be different from an actual dimension of each of the elements.

Figure 1:
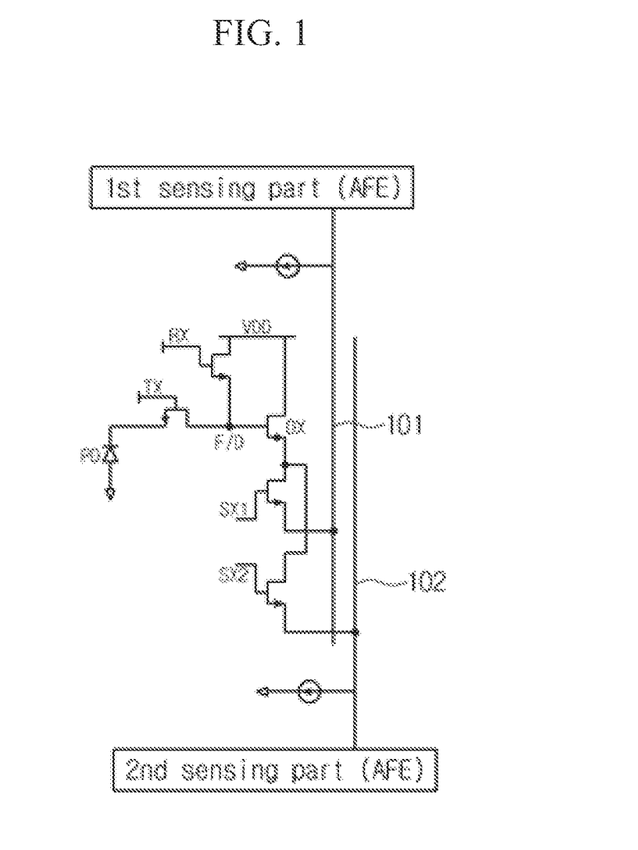
FIG. 1 is a schematic view of a configuration of an image sensor according to an embodiment of the subject invention.

FIG. 1 is a schematic view showing a configuration of an image sensor according to an embodiment of the subject invention.

Referring to FIG. 1, in an embodiment, an image sensor can include a photoelectric converter (PD), a transport switching unit TX, a floating diffusion region F/D, a reset switching unit RX, a drive switching unit DX, selection switching units SX1 and SX2, and a sensing part.

The photoelectric converter PD can be, for example, a photo diode to detect and convert light to charges, and integrate the charges, though embodiments are not limited thereto.

The transport switching unit TX can include, for example, one or more transistors, can be connected to the photoelectric converter PD, and can transport charges collected at the photoelectric converter PD to the floating diffusion region F/D when the transport switching unit TX is turned on by a driving power supply.

In addition, capacitance of the floating diffusion region F/D can include, for example, parasitic capacitance related to a capacitor or pn junction capacitance. The floating diffusion region F/D can be connected to the transport switching unit TX and receive charges integrated at the photoelectric converter PD through the transport switching unit TX and store the received charges.

The reset switching unit RX can include, for example, one or more transistors, can be connected to the floating diffusion region F/D, and can remove the charges from the photoelectric converter PD by draining the same to VDD.

The drive switching unit DX can include, for example, one or more transistors, can be connected to the floating diffusion region F/D, and can produce a signal having charge information by amplifying charges stored in the floating diffusion region F/D by operating as a source follower.

In certain embodiments, an image sensor can include a first selection switching unit SX1 for outputting a charge signal stored in the floating diffusion region F/D during a first integration period, and a second selection switching unit SX2 for outputting a charge signal stored in the floating diffusion region F/D during a second integration period.

The first and second integration periods can indicate a time length, and herein indicate an exposure time of an image sensor according to embodiments of the subject invention. For example, lights having high intensity of illumination, and intermediate and low intensities of illumination can be detected by varying an exposure time of an image sensor. Hereinafter, for the sake of understanding, the description will be made assuming that the first integration time indicates a long time such that the exposure time is long, and the second integration time indicates a short time that the exposure time is relatively short. That is, the first integration time is longer than the second integration time. These assumptions are for exemplary purposes only, and embodiments are not limited thereto.

Here, the 'long time' and the 'short time' have relative meanings for discriminating a length of the exposure time, and thus a length of the corresponding time may be changed according to changes or additions of embodiments of the subject invention.

In an embodiment an image sensor can include a first sensing part for receiving a charge signal output from the first selection switching unit SX1 through a sensing line 101, and a second sensing part for receiving a charge signal output from the second selection switching unit SX2 through a sensing line 102.

Each of the sensing parts can include an analog front end (AFE), and the AFE can convert a photo-electrically converted analog signal to a digital signal on the basis of an offset value. The AFEs can respectively include a sampling circuit and an analog-to-digital converter (ADC).

Although not shown in the drawings, the image sensor can further include an image signal processor (ISP), and the ISP can perform image signal processing, such as image synthesis.

The first selecting switching unit SX1 and the second selecting unit SX2 can selectively transport charges stored in the floating diffusion region F/D to the first sensing part or the second sensing part.

The first selecting switching unit SX1 can be connected to the drive switching unit DX and can include one or more transistors. The first selecting switching unit SX1 can be turned on during the first integrating period to be connected to the first sensing line 101. Accordingly, in the first integrating period, the charges stored in the floating diffusion region F/D can be transported to the first sensing line 101.

In addition, the second selection switching unit SX2 can also be connected to the drive switching unit DX, and can include one or more transistors. The second selection switching unit SX2 can be turned on during the second integration period to be connected to the second sensing line 102. Accordingly, in the second integration period, the charges stored in the floating diffusion region F/D can be transported to the second sensing line 102.

For example, in order to transport first charge information obtained by long time exposure to the first sensing line 101, the first selection switching unit SX1 can be turned on (in an on state), and the second selection switching unit SX2 can be turned off (in an off state). Accordingly, the first selection switching unit SX1 and the sensing line 101 can be connected to each other, and the first charge information can be transported to the first sensing part through the first sensing line 101. Although the first charge information transported to the first sensing line 101 is described as information on an image exposed for the long time, second charge information, which is information on an image exposed for the short time, can be enabled to be transported to the first sensing line 101.

In an embodiment, in order to transport the second charge information obtained by the short time exposure to the second sensing line 102, the first selection switching unit SX1 can be turned off, and the second selection switching unit SX2 can be turned on. Accordingly, the second selection switching unit SX2 and the second sensing line 102 can be connected to each other, and the second charge information can be transported to the second sensing part through the second sensing line 102.

Through these processes, image information exposed for the long time and image information exposed for the short time can both be detected. Hereinafter, it will be more specifically described with the accompanying drawings.

The first and second sensing parts can obtain the charge information, process a correlated double sampling (CDS) or a double sampling (DS), and then convert analog information to digital information to output as image information. Here, the CDS and DS means that charge amounts are measured before and after the floating diffusion region is reset, and a charge value measured during the first integration period or the second integration period can be precisely calculated by using the measured charge amount.

In an embodiment, the ISP can obtain image information from the sensing parts and a buffer memory, and can output a final image having a dynamic range after the ISP processing.

Hereinafter, a method of driving the above described elements of the embodiments will be described.

The reset switching unit RX and the transport switching unit TX can be turned on, and charges of the photoelectric converter PD and the floating diffusion region F/D can be removed. In an embodiment, this can be performed first.

Then, the reset switching unit RX and the transport unit TX can be turned off, and the photoelectric converter PD can detect a light and convert the light to charges to integrate the charges.

The reset switching unit RX can be turned on again, before the transport switching unit TX is turned on, to drain and remove the charges in the floating diffusion region.

When the transport switching unit TX is turned on, the charges of the photoelectric converter PD can be transported to the floating diffusion region F/D, and information on an image which is exposed for a long time or an image which is exposed for a short time can be included.

That is, the integration period of a light can be a period in which the transport switching unit operates again after the reset switching unit RX and the transport switching unit TX are driven. The first integration period (long time exposure) and the second integration period (short time exposure) can be discriminated by adjusting a driving timing of the transport switching unit TX.

The first selection switching unit SX1 can be turned on to output the first charge information of the floating diffusion region F/D in the first integration period to the first sensing part through the first sensing line 101.

After the charge information in the first integration period is output to the first sensing part, the RX operation and the TX operation described above can be further performed.

In order to obtain the charge information in the second integration period, the charges stored in the photoelectric converter PD during the second integration period can be transported to the floating diffusion region F/D. In the second integration period, the second selection switching unit SX2 can be turned on, and the charge information of the floating diffusion region F/D can be transported to the second sensing part through the second sensing line 102.

During the respective first and second integration periods, the charge information transported to the first and second sensing parts can be CDS- or DS-processed by each sensing part, converted from the analog information to the digital information, and output as image information.

Due to a time difference between the first and second integration periods for a single pixel, a signal processing by the CDS or the DS can be performed in different time slots.

The image signal processor can obtain image information from the sensing parts to perform, on the image information, image processing (e.g., image synthesis), and then output a final image having a dynamic range.

According to embodiments of the subject invention, a light can advantageously be detected by varying the integration periods in a single pixel without additional elements or processes.

Figure 2:
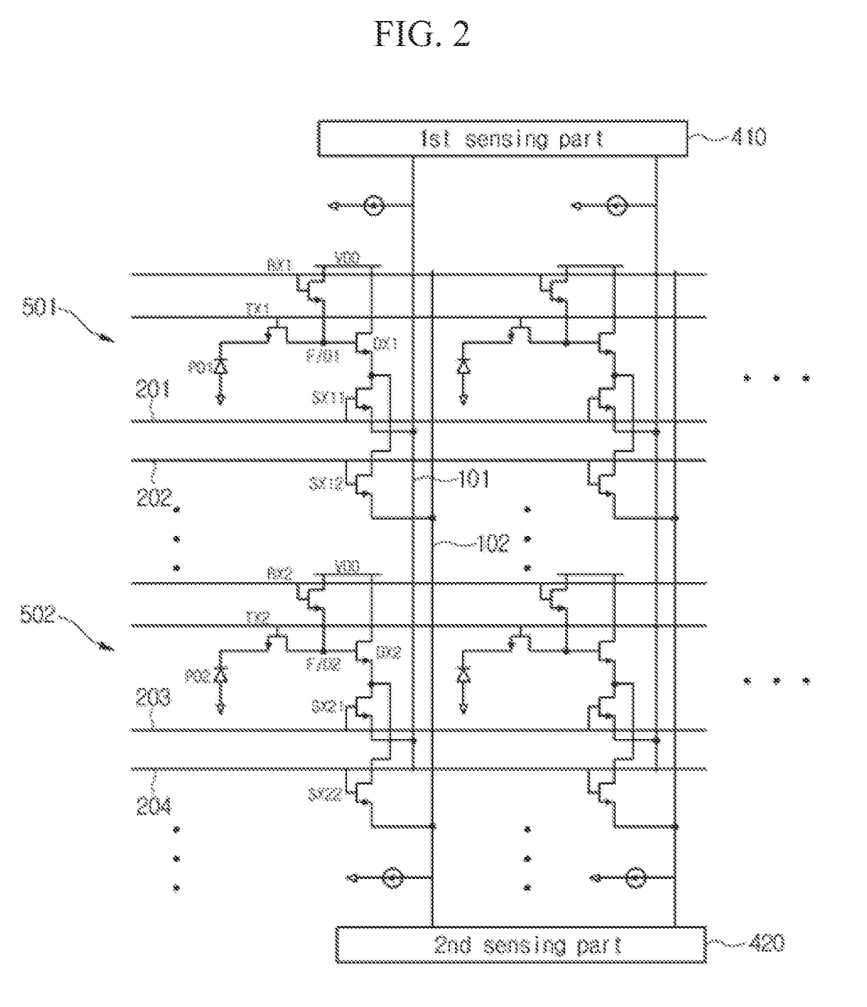
FIG. 2 is a view of a plurality of pixels and a circuit configuration in an image sensor according to an embodiment of the subject invention.

FIG. 2 is a schematic view showing a plurality of pixels and a circuit configuration in an image sensor according to an embodiment of the subject invention. A supply voltage VDD of the switching unit can be connected in columns or rows; in an embodiment, it is connected in rows as shown in FIG. 2.

Figure 3:
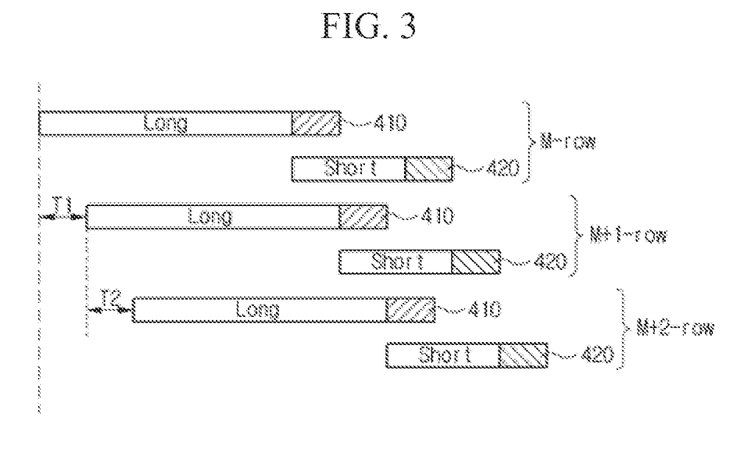
FIGS. 3 and 4 are views of processing an image respectively obtained at first and second integrating periods according to an embodiment of the subject invention.
Figure 4:
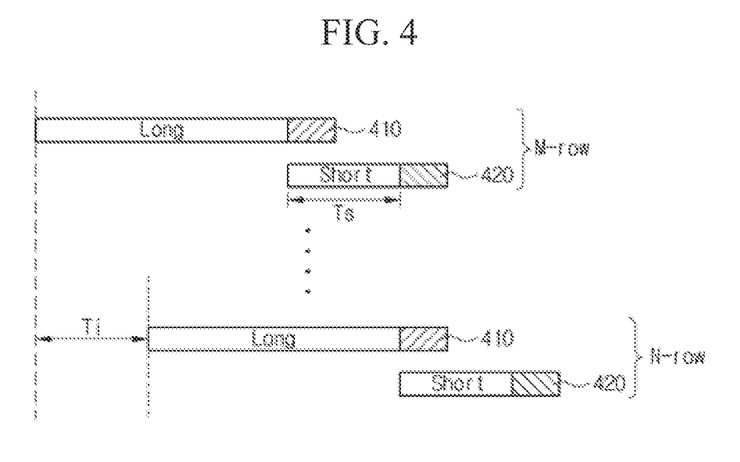

FIGS. 3 and 4 illustrate operations of processing images respectively obtained during the first and second integration periods according to an embodiment of the subject invention.

Elements shown in FIG. 2 that are also present in FIG. 1 can have the same principle of operation, and their descriptions are not repeated here.

Referring to FIG. 2, pixels of each row can share driving power supplies 201 and 202 and can perform the same operation.

When an image of a frame is measured, an allowable exposure time T of pixels in a row can be limited. The allowable exposure time for an image sensor can vary (e.g., according to the manufacturers), and herein an allowable exposure time of a specifically corresponding image sensor is referred to as T.

In order to measure an image having a dynamic range, respective image information the first and second integration periods can be obtained. That is, information on an image having a long exposure time and information on an image having a short exposure time can be obtained. In addition, the sensing part can process information on pixels by a row unit.

A frame rate can be increased by distributing the allowable exposure time T given to pixels in a single row, and information processing time of pixels in a row by a sensing part.

Referring to FIG. 3, first charge information stored in the M-th row pixels can be output to the first sensing line 101 through the first selection switching unit SX1 for the M-th row during the first integration period.

For exemplary purposes, a row including a first pixel 501 as shown in FIG. 2 is referred to as M-th row in FIG. 3, and a row including a second pixel 502 as shown in FIG. 2 is referred to as (M+1)-th row in FIG. 3.

The first charge information can be transported to the first sensing part through the sensing line 101. The first sensing part can perform the CDS or DS processing on the received first charge information, convert to a digital signal, and store the same to a buffer memory.

While the first sensing part 410 processes the first charge information (indicated as long in FIG. 3) in the first integration period for the M-th row pixels, second charge information on the M-th row pixels can be obtained. That is, as shown in M-th row of FIG. 3, after charge information is obtained during the first integration period, charge information (second charge information) can be obtained during the second integration period for the corresponding M-th row pixels.

Through these processes, different charge information for the M-th row pixels is consecutively obtained, and the first sensing part 410 and the second sensing part 420 perform data processing on the first information and the second information at a predetermined time interval.

In particular, a start time to obtain the first charge information from an (M+1)-th row is a timing delayed by T1 from a start time to obtain the first charge information from an M-th row. Here, T1 delayed to obtain the first charge information from the next row pixels can be longer than a time (reference numeral 410 in FIG. 3) to perform data processing on the first charge information obtained from previous row (M-th row) pixels. This enables the first sensing part to complete data processing for the first charge information obtained from the M-th row pixels, and then consecutively process the first charge information obtained from (M+1)-th row. In this view, T1 can be the same as the time that the first sensing part processes the first charge information of M-th row.

In this scanning scheme, the first charge information (long) and second charge information (short) can be obtained. Similarly, a time to obtain the first charge information for (M+2)-th row can also be delayed by T2 (or possibly T1) from a stall time of (M+1)-th row.

Referring to FIG. 4, operating times of the sensing parts will be described.

While the first charge information on the M-th row pixels in the first integration period is obtained, the first charge information on N-th row pixels in the first integration period can also be obtained. However, as described above, there is a delay Ti between a start point of the first integration period for the M-th row and a start point of the first period for an N-th row, and the delay time between the start points of obtaining the first charge information of the M-th row and the Nth row relates to existence of several rows between the M-th row and the N-th row, and the time for processing charge information by the first sensing part 410 or the second sensing part 420.

For example, when time for processing the first charge information obtained from the M-th row pixels by the first sensing part 401 is 0.01 second, time Ts of the second integration period is 0.03 second, and the N-th row is (M+3)-th row, the delay time Ti may be 0.03. In this case, while the second sensing part 420 processes the second charge information obtained from the M-th row, the first sensing part 410 processes the first charge information obtained from the N-th row. When it is assumed that data processing times by the first sensing part 410 and the second sensing part 420 are the same, the first sensing part 410 and the second sensing part 420 can respectively perform data processing on the first information and the second information for different row pixels in the same time.

Through this process, the first charge information and the second charge information obtained from pixels of each row can be processed by the first sensing part 410 and the second sensing parts 420. Observed at a predetermined time, the first sensing part 410 and the second sensing part 420 can process data for different row pixels.

That is, according to certain embodiments, since a plurality of sensing parts sequentially and consecutively process charge information obtained from pixels of each row, the time taken to process an image having a long exposure time and an image having a short exposure time can be reduced.

Figure 5:
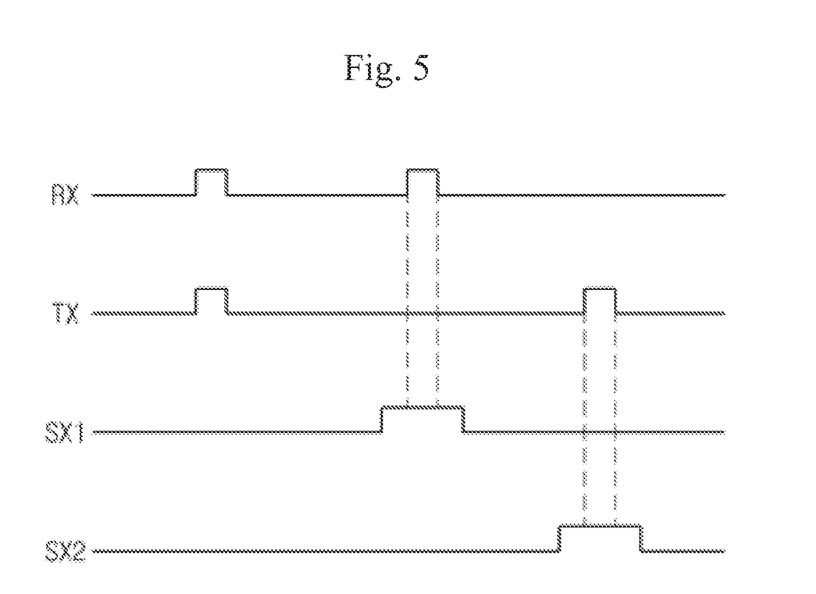
FIG. 5 is a timing diagram of a method of measuring overflowed charges according to an embodiment of the subject invention.

FIG. 5 is a timing diagram for illustrating a method of measuring overflowed charges together according to an embodiment of the subject invention.

In an embodiment, an image sensor can have the same circuit and configuration as those depicted in FIGS. 1 and 2, but their operations can be different. When a circuit operates according to the timing diagram shown in FIG. 4, a range of color reproduction of an image sensor can be widened. That is, when an object is imaged in a bright place, charges stored in a photoelectric converter can overflow. In order to sense the overflowed charges to detect a signal, operations of the reset switching unit RX, the transport switching unit TX, the first selection switching unit SX1, and the second selection switching unit SX2 can be controlled.

Hereinafter, it is assumed for exemplary purposes that charges stored in a photoelectric converter overflow, when an object is imaged in a bright place.

First, the reset switching unit RX and the transport witching unit TX can be turned on to remove charges in the photoelectric converter PD and the floating diffusion region F/D.

Then, the reset switching unit RX and the transport switching unit TX can be turned off, and the photoelectric converter can detect a light, convert the light to charges, and integrate the charges.

When a light having a high intensity exceeds charge storage capacity of the photoelectric converter PD, the photoelectric converter PD can reach an oversaturation state. The oversaturated charges can overflow to the floating diffusion region F/D, even if the transport switching unit TX is turned off.

When the first selection switching unit SX1 is turned on at a predetermined time, and the overflowed charges are stored in the floating diffusion region F/D, the corresponding charges can be transported to the first sensing part 410 through the first sensing line 101.

Then, in a state where the first selection switching unit SX1 is turned on, the CDS or the DS can be performed for measuring charges of the floating diffusion region F/D before and after the reset switching unit RX is turned on. This is the same as described above. Through this process, the first sensing part 410 can detect charges, which are overflowed in the photoelectric converter PD and stored in the floating diffusion region. Although herein the overflowed charges are measured by the first sensing part 410, in an embodiment, it is possible that the second selection switching unit SX2 can be turned on, and the second sensing part 420 can measure the overflowed charges. Then, the second sensing part 420 can detect charges stored in the photoelectric converter PD.

The transport switching unit TX can be turned on, and charges stored in the photoelectric converter PD can be transported to the floating diffusion region F/D. The second switching unit SX2 can be turned on before the transport switching unit TX is turned on, and the second sensing part 420 can perform the CDS or the DS.

That is, due to turning on of the transport switching unit TX, the charges transported to the floating diffusion region F/D can be transported to the second sensing part 420 through the second sensing line 102.

In addition, image information obtained through the first sensing part 410 and the second sensing part 420 can be summed for each pixel, and, through this process, a range of color reproduction of an image sensor can be widened.

Meanwhile, when the photoelectric converter PD is not overflowed, these operations can be executed and, in this case, an image sensor according to some embodiments of the subject invention can be similar to those of the related art image sensor.

According to many embodiments of the subject invention, a frame rate can be increased when images having different exposure times are synthesized to form a wide dynamic range (WDR) image.

In addition, color reproduction can also be increased by operating a circuit to sense charges overflowed in a photoelectric converter.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

What is claimed is:

1. An image sensor including a plurality of unit pixels, each of the unit pixels comprising:
   a photoelectric converter as a light receiving element;
   a transport switching unit transporting charges in the photoelectric converter to a floating diffusion region;
   a first switching unit selectively connecting the floating diffusion region to a first sensing line;
   a second switching unit selectively connecting the floating diffusion region to a second sensing line;
   a first sensing part connected to the first sensing line and converting a photo-electrically converted analog signal, stored in the floating diffusion region, to a digital signal on the basis of a first offset value; and
   a second sensing part connected to the second sensing line and converting a photo electrically converted analog signal, stored in the floating diffusion region, to a digital signal on the basis of a second offset value;
   wherein the first sensing part and the second sensing part perform data processing on charge information obtained from a first row of pixels during a first integration period and a second row of pixels during a second integration period at a predetermined timing, and the first and second rows of pixels have different exposure times.

2. The image sensor according to claim 1, wherein there is a delay by a preset time between a time when the charge information is obtained from the first row of pixels, and a time when the charge information is obtained from the second row of pixels, in the image sensor.

3. The image sensor according to claim 1, wherein there is a delay by a data processing time of the first sensing part and the second sensing part between a time when the charge information is obtained from the first row of pixels, and a time when the charge information is obtained from a row of pixels adjacent to the first row of pixels, in the image sensor.

4. The image sensor according to claim 1, wherein the transport switching unit comprises one or more transistors connected to the photoelectric converter.

5. The image sensor according to claim 1, wherein the floating diffusion region is connected to the transport switching unit.

6. The image sensor according to claim 1, further comprising a reset switching unit.

7. The image sensor according to claim 1, wherein the reset switching unit comprises one or more transistors connected to the floating diffusion region, and the reset switching unit is configured to remove charges from the photoelectric converter.

8. The image sensor according to claim 1, further comprising a drive switching unit.

9. The image sensor according to claim 1, wherein the drive switching unit comprises one or more transistors connected to the floating diffusion region, and the drive switching unit is configured to produce a signal having charge information by amplifying charges stored in the floating diffusion region.

10. The image sensor according to claim 8, wherein the first and second switching units are connected to the drive switching unit.

11. An image sensor comprising:
   a photoelectric converter as a light receiving element;
   a transport switching unit transporting charges in the photoelectric converter to a floating diffusion region;
   a first switching unit selectively connecting the floating diffusion region to a first sensing line;
   a second switching unit selectively connecting the floating diffusion region to a second sensing line;
   a first sensing part connected to the first sensing line and converting a photo-electrically converted analog signal, stored in the floating diffusion region, to a digital signal on the basis of an offset value; and
   a second sensing part connected to the second sensing line and converting a photo-electrically converted analog signal, stored in the floating diffusion region, to a digital signal on the basis of an offset value;
   wherein the image sensor is configured such that, in a first timing, for detecting charges overflowed from the photoelectric converter, first charge information of the floating diffusion region is transported to the first sensing line and the first sensing part, due to operation of the first switching unit; and
   wherein the image sensor is configured such that, in a second timing, the transport switching unit is operated, charges stored in the photoelectric converter are transported to the floating diffusion region, and second charge information in the floating diffusion region is transported to the second sensing line and the second sensing part due to operation of the second switching unit.

12. The image sensor according to claim 11, wherein, in the first timing, the transportation of the first charge information of the floating diffusion region to the first sensing line and the first sensing part, is performed in a state where the transport switching unit is turned off.

13. The image sensor according to claim 11, wherein the transport switching unit comprises one or more transistors connected to the photoelectric converter.

14. The image sensor according to claim 11, wherein the floating diffusion region is connected to the transport switching unit.

15. The image sensor according to claim 11, further comprising a reset switching unit.

16. The image sensor according to claim 15, wherein the reset switching unit comprise one or more transistors connected to the floating diffusion region, the reset switching unit is configured to remove charges from the photoelectric converter.

17. The image sensor according to claim 11, further comprising a drive switching unit.

18. The image sensor according to claim 17, wherein the drive switching unit comprises one or more transistors connected to the floating diffusion region, and the drive switching unit is configured to produce a signal having charge information by amplifying charges stored in the floating diffusion region.

19. A method of driving an image sensor, the image sensor comprising:
   a transport switching unit transporting charges in the photoelectric converter to a floating diffusion region;
   a first switching unit selectively connecting the floating diffusion region to a first sensing line;
   a second switching unit selectively connecting the floating diffusion region to a second sensing line;

a first sensing part connected to the first sensing line and converting a photo-electrically converted analog signal, stored in the floating diffusion region, to a digital signal on the basis of an offset value; and a second sensing part connected to the second sensing line and converting a photo-electrically converted analog signal, stored in the floating diffusion region, to a digital signal on the basis of an offset value;

wherein the method comprises:
- in a first timing, operating the first switching unit to transport first charge information of the floating diffusion region to the first sensing line and the first sensing part;
- in a second timing, operating the transport switching unit to transport charges stored in the photoelectric converter to the floating diffusion region; and
- in the second timing, operating the second switching unit to transport second charge information from the floating diffusion region to the second sensing line and the second sensing part.

* * * * *